Patented Oct. 17, 1922.

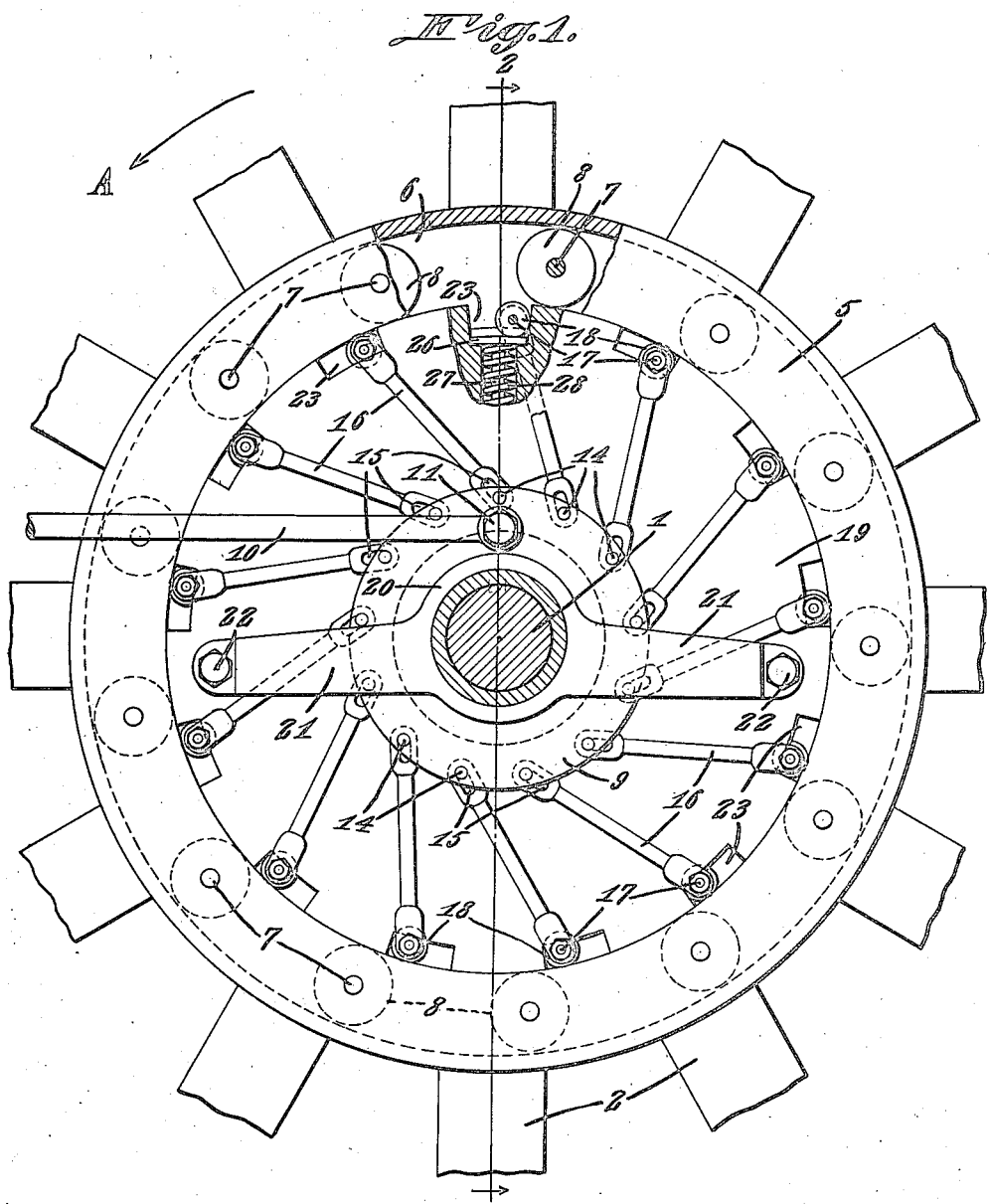

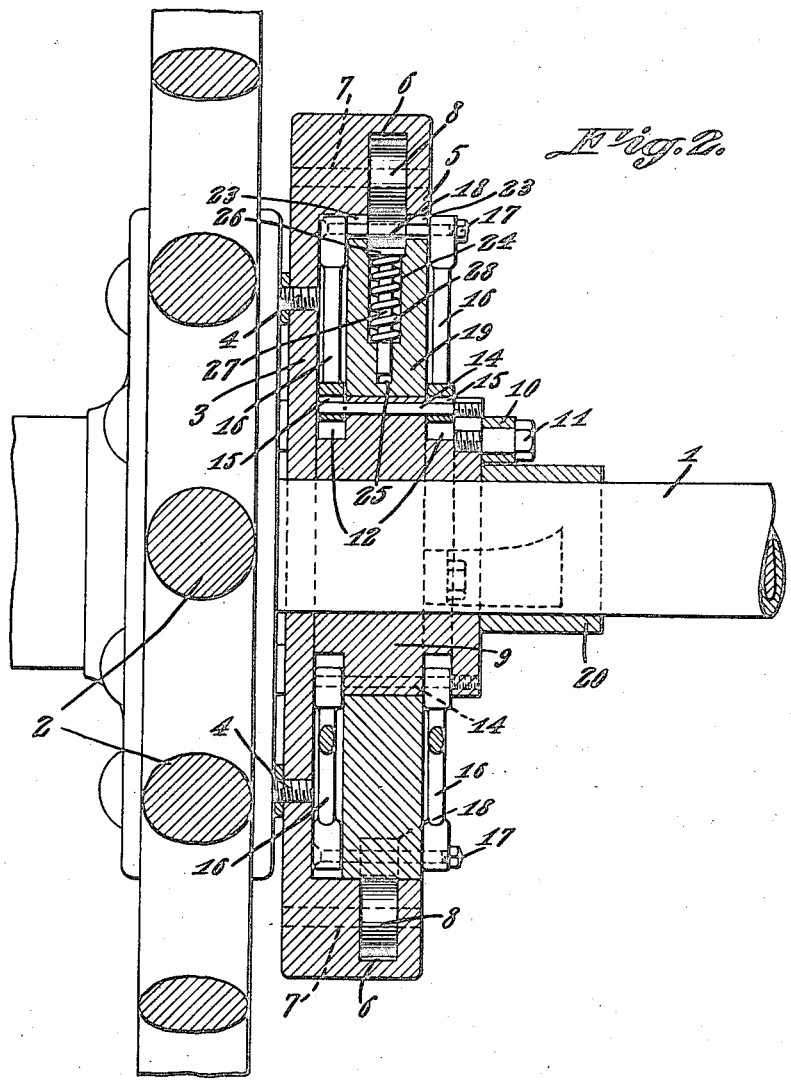

1,432,414

UNITED STATES PATENT OFFICE.

MAJOR J. ROBINSON, OF LONG BEACH, CALIFORNIA, ASSIGNOR TO ANNA J. ROBINSON AND MAY ROBINSON BETTS, BOTH OF LONG BEACH, CALIFORNIA.

AUTOMOBILE BRAKE.

Application filed June 24, 1921. Serial No. 480,116.

*To all whom it may concern:*

Be it known that I, MAJOR J. ROBINSON, a citizen of the United States, residing at Long Beach, in the county of Los Angeles and State of California, have invented a new and useful Automobile Brake, of which the following is a specification.

It is the object of this invention to provide a simple, strong and efficient brake for a vehicle wheel.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in rear elevation, a device constructed in accordance with the invention, parts being broken away and parts appearing in section; Figure 2 is a section on the line 2—2 of Figure 1, parts remaining in elevation.

The numeral 1 marks an axle carrying a ground wheel 2. An outer member or disk 3 is provided and is secured at 4 to the wheel 2. The member 3 has an inwardly extended rim 5 at its periphery, the rim having a groove 6. Shafts 7 are mounted in the rim 5 and extend across the groove 6. Rollers 8 are journaled on the shafts 7 and are located in the groove 6.

The device includes an inner member in the form of an element 9 rotatably mounted, for adjustment, on the axle 1. The member 9 may be rotated any suitable way, for instance, by a rod 10 pivoted at 11 to the part 9, and under the control of an operator. The member 9 has peripheral recesses 12. Pivot elements 14 are mounted in the member 9 and extend into the recesses, the pivot elements being received in elongated openings 15 formed in the inner ends of links 16, the links being disposed in pairs, and the members of each pair being united, at their outer ends, by transverse connections 17, whereon rollers 18 are journaled, the rollers 18 being adapted to cooperate with the rollers 8, in a way which will be described hereinafter.

Disposed between the rim 5 of the member 3 and the inner member 9 is an intermediate annular member 19. A collar 20 is secured to the axle 1 and has arms 21 secured as shown at 22 to the member 19. The member 19, therefore is fixed. In the member 19, at its periphery, openings 23 are fashioned. Each opening 23 communicates with a reduced bore 24 in the member 19, the bore 24 being reduced in diameter at its inner end, as denoted by the numeral 25. A plurality of plungers are provided. Each plunger includes a head 26 located in the opening 23, and a stem 27 slidable in the part 25 of the bore 24. A compression spring 28 is located in the bore 24 and, cooperating with the head 26, thrusts the plunger outwardly. The head 26 of the plunger bears against the roller 18, the intermediate annular member 19 being located between the links 16 whereon the said roller is carried.

Suppose that the wheel is rotating in the direction of the arrow A in Figure 1. Suppose, also, that the inner element or member 9 is rotated in the direction of the arrow A, through the instrumentality of the rod 10. Then, the links 16 are set free, so that they may move outwardly to a slight extent. The links 16 are moved outwardly by the action of the springs 28, the springs thrusting the plungers 26—27 outwardly, the heads 26 of the plungers bearing against the rollers 18. The rollers 18 thus are held yieldingly in the path of the rollers 8 on the member 3 which rotates the wheel 2. When the rollers 8 travel over the rollers 18, a braking effect will be brought about, and when the links 16 are permitted to move outwardly as far as they will go, it may be possible to lock or hold the wheel 2, absolutely, against rotation.

Assuming, however, that the rollers 8 pass across the rollers 18, in the direction of the arrow A, the links 16 will swing in the direction of the arrow A toward the left hand end of the openings 23, in Figure 1. As soon as the roller 8 has moved forwardly in the direction of the arrow A, to a point slightly in advance of the center of the roller 18, the link 16, under the action of the spring 28, will swing backwardly in a direction opposite to that indicated by the arrow A, the roller 18 being presented in the path of the next approaching roller 8.

Having thus described the invention, what is claimed is:—

1. In a device of the class described, an inner member mounted for rocking movement; means under the control of an operator for rocking said member; a fixed intermediate member; a wheel; an outer member secured to the wheel and having circumferentially spaced elements; links having lost motion connection with the inner member; means on the outer ends of the links for engagement with said spaced elements of the outer member; plungers slidable in the intermediate member and constituting means for carrying the links outwardly; and spring means on the intermediate member for advancing the plungers.

2. In a device of the class described, an inner member mounted for rocking movement; means under the control of an operator for rocking said member; a fixed intermediate member; a wheel; an outer member secured to the wheel and having circumferentially spaced elements; links having lost motion connection with the inner member; means on the outer ends of the links for engagement with said spaced elements of the outer member; and resiliently actuated means carried by the intermediate member for moving the links outwardly.

3. In a device of the class described, an inner member mounted for rocking movement; means under the control of an operator for rocking said member; a fixed intermediate member; a wheel; an outer member secured to the wheel and having circumferentially spaced rollers; links guided in the intermediate member and having lost motion connection with the inner member; rollers journaled on the outer ends of the links; and spring means for advancing the links to dispose the rollers on the links in the path of the rollers on the outer member, when rocking movement is imparted to the inner member.

4. In a device of the class described, an inner member mounted for rocking movement; means under the control of an operator for rocking said member; a fixed intermediate member; a wheel; an outer member secured to the wheel; circumferentially spaced rollers on the outer member; links having lost motion connection with the inner member; rollers journaled on the outer ends of the links for engagement with the rollers on the outer member; plungers slidable in the intermediate member and engaging the rollers on the links to advance said rollers and the links; and spring means on the intermediate member for advancing the plungers.

5. In a device of the class described, an inner member mounted for rocking movement; means under the control of an operator for rocking said member; a fixed inner member; a wheel; an outer member secured to the wheel and having circumferentially spaced rollers; links having lost motion connection with the inner member; rollers on the outer ends of the links, for engagement with the rollers of the outer member, the intermediate member having openings wherein the rollers of the links may have limited movement circumferentially of the intermediate member; plungers slidable in the intermediate member and bearing against the rollers on the links; and spring means on the intermediate member for advancing the plungers.

In testimony that I claim the foregoing as my own, I have hereto affixed my signature in the presence of two witnesses.

MAJOR J. ROBINSON.

Witnesses:
EMPSIE C. FARRELL,
M. L. DIVINE.